United States Patent [19]
Ross

[11] Patent Number: 5,974,390
[45] Date of Patent: Oct. 26, 1999

[54] SYSTEM AND METHOD FOR ASSURING PREDICTABLE GAINS

[75] Inventor: Alan J. Ross, Newton, Mass.

[73] Assignee: The Mutual Life Insurance Company of New York, New York, N.Y.

[21] Appl. No.: 08/897,293

[22] Filed: Jul. 21, 1997

[51] Int. Cl.⁶ ................................................. G06F 15/30
[52] U.S. Cl. ............................................. 705/4; 705/36
[58] Field of Search .................................. 705/4, 36, 38

[56] References Cited

U.S. PATENT DOCUMENTS

| | | | |
|---|---|---|---|
| 4,750,121 | 6/1988 | Halley et al. ............................... | 705/4 |
| 4,969,094 | 11/1990 | Halley et al. ............................... | 705/4 |
| 5,429,506 | 7/1995 | Brophy et al. .............................. | 705/4 |
| 5,752,236 | 5/1998 | Sexton et al. .............................. | 705/4 |
| 5,754,980 | 5/1998 | Anderson et al. .......................... | 705/4 |
| 5,806,047 | 9/1998 | Hackel et al. .............................. | 705/36 |

OTHER PUBLICATIONS

Philipot, Tom."Guarding your assets with a life insurance trust." Kiplinger's Personal Finance Magazine, vol. 48, No. 4, p. 115, Apr. 1994.
"A Client's guide to irrevocable life insurance trusts." Perenich & Carroll, USA Law (www.usalaw.com/lifeins.html), 1999.

Primary Examiner—Allen R. MacDonald
Assistant Examiner—Michele Stuckey Crecca
Attorney, Agent, or Firm—Robert D. Schaffer; Rogers & Wells LLP

[57] ABSTRACT

A system and method is described for creating a predictable flow of funds from an otherwise unpredictable source. An investment and receiving vehicle is established where participants pool their ownership of insurance policies so as to share in the proceeds from those policies.

10 Claims, 12 Drawing Sheets

RECEIVING/INVESTMENT VEHICLE DATABASE

| A | B | C | D | E | F | G | H |
|---|---|---|---|---|---|---|---|
| PARTICI-PANT NO. | INSURED'S NO. | INSURED'S NAME | DOB | SEX | SMOKING STATUS | CLASS | INSURER CARRIER |
| | | | | | | | |
| | | | | | | | |

| I | J | K | L | M | N | O | P | Q |
|---|---|---|---|---|---|---|---|---|
| POLICY NO. | ISSUE DATE | ASSIGNED DEATH BENEFIT | ISSUE AGE | DUR | POLICY OWNER | PARTICI-PANT UNITS | ALLOC % | CUM ALLOC % PER OWNER |
| | | | | | | | | |
| | | | | | | | | |

| Insured | Name | DOB | Sex | Smoke | Class | Ins.Co. | Policy | Issue Date | Assigned | Issue Age | Dur | Policy | E[qx] | Participation Units | Allocation Percentage | Cumulative Allocation % Per Owner |
|---|---|---|---|---|---|---|---|---|---|---|---|---|---|---|---|---|
| 1 | John or Jane Doe | 04/04/37 | M | N | GI Nonsmoker | MONY | 1 | 12/01/96 | 124,556 | 60 | 1 | P1 | 0.00242 | 301.74 | 0.35170% | 0.35170% |
| 2 | John or Jane Doe | 08/08/54 | M | N | GI Nonsmoker | MONY | 2 | 12/01/96 | 306,551 | 42 | 1 | P1 | 0.00069 | 211.52 | 0.24654% | 0.59824% |
| 3 | John or Jane Doe | 12/07/40 | M | N | GI Nonsmoker | MONY | 3 | 12/01/96 | 348,619 | 55 | 1 | P1 | 0.00181 | 630.13 | 0.73446% | 1.33270% |
| 4 | John or Jane Doe | 05/27/30 | F | N | GI Nonsmoker | MONY | 4 | 12/01/96 | 129,873 | 67 | 1 | P1 | 0.00212 | 274.68 | 0.32016% | 1.65286% |
| 5 | John or Jane Doe | 03/27/42 | M | N | GI Nonsmoker | MONY | 5 | 12/01/96 | 169,634 | 55 | 1 | P1 | 0.00181 | 306.61 | 0.35738% | 2.01024% |
| 6 | John or Jane Doe | 10/25/45 | M | Y | GI Smoker | MONY | 6 | 12/01/96 | 180,231 | 51 | 1 | P1 | 0.00297 | 535.29 | 0.62391% | 2.63415% |
| 7 | John or Jane Doe | 10/28/36 | M | N | GI Nonsmoker | MONY | 7 | 12/01/96 | 281,083 | 60 | 1 | P1 | 0.00242 | 680.92 | 0.79366% | 3.42782% |
| 8 | John or Jane Doe | 01/12/38 | M | N | GI Nonsmoker | MONY | 8 | 12/01/96 | 305,225 | 59 | 1 | P1 | 0.00233 | 709.65 | 0.82715% | 4.25496% |
| 9 | John or Jane Doe | 12/11/30 | M | N | GI Nonsmoker | MONY | 9 | 12/01/96 | 314,711 | 65 | 1 | P1 | 0.00360 | 1,132.96 | 1.32055% | 5.57551% |
| 10 | John or Jane Doe | 11/16/45 | F | N | GI Nonsmoker | MONY | 10 | 12/01/96 | 242,991 | 51 | 1 | P1 | 0.00086 | 209.58 | 0.24428% | 5.81979% |
| 11 | John or Jane Doe | 09/18/35 | F | N | GI Nonsmoker | MONY | 11 | 12/01/96 | 342,025 | 61 | 1 | P1 | 0.00151 | 515.60 | 0.60097% | 6.42076% |
| 12 | John or Jane Doe | 06/24/39 | M | N | GI Nonsmoker | MONY | 12 | 12/01/96 | 310,032 | 57 | 1 | P1 | 0.00212 | 655.72 | 0.76429% | 7.18505% |
| 13 | John or Jane Doe | 04/09/49 | M | Y | GI Smoker | MONY | 13 | 12/01/96 | 101,124 | 48 | 1 | P1 | 0.00246 | 248.61 | 0.28978% | 7.47482% |
| 14 | John or Jane Doe | 02/11/51 | M | Y | GI Smoker | MONY | 14 | 12/01/96 | 238,902 | 46 | 1 | P1 | 0.00211 | 504.56 | 0.58810% | 8.06292% |
| 15 | John or Jane Doe | 05/24/35 | F | N | GI Nonsmoker | MONY | 15 | 12/01/96 | 111,111 | 62 | 1 | P1 | 0.00161 | 179.17 | 0.20883% | 8.27175% |
| 16 | John or Jane Doe | 08/02/47 | M | N | GI Nonsmoker | MONY | 16 | 12/01/96 | 328,190 | 49 | 1 | P1 | 0.00120 | 393.83 | 0.45903% | 8.73079% |
| 17 | John or Jane Doe | 09/23/48 | M | N | GI Nonsmoker | MONY | 17 | 12/01/96 | 285,485 | 48 | 1 | P1 | 0.00112 | 319.03 | 0.37185% | 9.10264% |
| 18 | John or Jane Doe | 06/27/35 | M | N | GI Nonsmoker | MONY | 18 | 12/01/96 | 280,467 | 61 | 1 | P1 | 0.00253 | 708.88 | 0.82625% | 9.92889% |
| 19 | John or Jane Doe | 04/14/44 | M | N | GI Nonsmoker | MONY | 19 | 12/01/96 | 196,668 | 53 | 1 | P1 | 0.00155 | 303.85 | 0.35416% | 10.28305% |
| 20 | John or Jane Doe | 12/01/48 | M | N | GI Nonsmoker | MONY | 20 | 12/01/96 | 284,250 | 48 | 1 | P1 | 0.00112 | 317.65 | 0.37024% | 10.65330% |
| 21 | John or Jane Doe | 12/26/31 | M | N | GI Nonsmoker | MONY | 21 | 12/01/96 | 280,122 | 64 | 1 | P1 | 0.00324 | 907.60 | 1.05787% | 11.71116% |
| 22 | John or Jane Doe | 06/05/42 | M | N | GI Nonsmoker | MONY | 22 | 12/01/96 | 159,181 | 54 | 1 | P1 | 0.00167 | 266.23 | 0.31031% | 12.02147% |
| 23 | John or Jane Doe | 12/27/43 | M | Y | GI Smoker | MONY | 23 | 12/01/96 | 247,216 | 52 | 1 | P1 | 0.00314 | 775.02 | 0.90334% | 12.92482% |
| 24 | John or Jane Doe | 12/14/47 | M | N | GI Nonsmoker | MONY | 24 | 12/01/96 | 100,636 | 48 | 1 | P1 | 0.00112 | 112.46 | 0.13108% | 13.05590% |

FIG. 4B

| Insured | Name | DOB | Sex | Smoke | Class | Ins.Co. | Policy | Issue Date | Assigned | Issue Age | Dur | Policy | E[qx] | Participation Units | Allocation Percentage | Cumulative Allocation % Per Owner |
|---|---|---|---|---|---|---|---|---|---|---|---|---|---|---|---|---|
| 25 | John or Jane Doe | 04/16/43 | F | N | GI Nonsmoker | MONY | 25 | 12/01/96 | 287,051 | 54 | 1 | P1 | 0.00099 | 284.18 | 0.33123% | 13.38713% |
| 26 | John or Jane Doe | 02/06/50 | M | N | GI Nonsmoker | MONY | 26 | 12/01/96 | 100,275 | 47 | 1 | P2 | 0.00104 | 104.54 | 0.12184% | 0.12184% |
| 27 | John or Jane Doe | 02/23/52 | F | N | GI Nonsmoker | MONY | 27 | 12/01/96 | 207,255 | 45 | 1 | P2 | 0.00065 | 133.68 | 0.15581% | 0.27766% |
| 28 | John or Jane Doe | 05/22/44 | M | Y | GI Smoker | MONY | 28 | 12/01/96 | 225,507 | 53 | 1 | P2 | 0.00340 | 766.50 | 0.89341% | 1.17107% |
| 29 | John or Jane Doe | 03/14/36 | M | N | GI Nonsmoker | MONY | 29 | 12/01/96 | 235,689 | 61 | 1 | P2 | 0.00253 | 595.70 | 0.69434% | 1.86540% |
| 30 | John or Jane Doe | 10/07/51 | M | N | GI Nonsmoker | MONY | 30 | 12/01/96 | 114,937 | 45 | 1 | P2 | 0.00088 | 100.86 | 0.11756% | 1.98296% |
| 31 | John or Jane Doe | 09/26/36 | M | N | GI Nonsmoker | MONY | 31 | 12/01/96 | 132,006 | 60 | 1 | P2 | 0.00242 | 319.78 | 0.37273% | 2.35569% |
| 32 | John or Jane Doe | 12/07/50 | M | Y | GI Smoker | MONY | 32 | 12/01/96 | 260,165 | 45 | 1 | P2 | 0.00193 | 502.25 | 0.58541% | 2.94110% |
| 33 | John or Jane Doe | 01/24/35 | M | N | GI Nonsmoker | MONY | 33 | 12/01/96 | 239,330 | 62 | 1 | P2 | 0.00263 | 628.24 | 0.73226% | 3.67336% |
| 34 | John or Jane Doe | 01/24/36 | M | N | GI Nonsmoker | MONY | 34 | 12/01/96 | 307,553 | 61 | 1 | P2 | 0.00253 | 777.34 | 0.90605% | 4.57940% |
| 35 | John or Jane Doe | 05/28/50 | F | N | GI Nonsmoker | MONY | 35 | 12/01/96 | 185,726 | 47 | 1 | P2 | 0.00072 | 133.72 | 0.15586% | 4.73526% |
| 36 | John or Jane Doe | 01/06/33 | M | N | GI Nonsmoker | MONY | 36 | 12/01/96 | 135,408 | 64 | 1 | P2 | 0.00324 | 438.72 | 0.51136% | 5.24663% |
| 37 | John or Jane Doe | 05/20/43 | M | Y | GI Smoker | MONY | 37 | 12/01/96 | 195,235 | 54 | 1 | P2 | 0.00368 | 718.37 | 0.83731% | 6.08393% |
| 38 | John or Jane Doe | 12/16/47 | F | Y | GI Smoker | MONY | 38 | 12/01/96 | 197,867 | 48 | 1 | P2 | 0.00165 | 326.48 | 0.38054% | 6.46447% |
| 39 | John or Jane Doe | 03/18/36 | F | Y | GI Smoker | MONY | 39 | 12/01/96 | 188,329 | 61 | 1 | P2 | 0.00332 | 624.59 | 0.72801% | 7.19248% |
| 40 | John or Jane Doe | 01/23/35 | M | N | GI Nonsmoker | MONY | 40 | 12/01/96 | 131,028 | 62 | 1 | P2 | 0.00263 | 343.95 | 0.40090% | 7.59337% |
| 41 | John or Jane Doe | 03/24/39 | M | N | GI Nonsmoker | MONY | 41 | 12/01/96 | 332,434 | 58 | 1 | P2 | 0.00222 | 738.00 | 0.86020% | 8.45357% |
| 42 | John or Jane Doe | 05/27/47 | M | N | GI Nonsmoker | MONY | 42 | 12/01/96 | 113,764 | 50 | 1 | P2 | 0.00128 | 145.05 | 0.16907% | 8.62264% |
| 43 | John or Jane Doe | 02/26/53 | M | N | GI Nonsmoker | MONY | 43 | 12/01/96 | 168,442 | 44 | 1 | P2 | 0.00081 | 136.44 | 0.15903% | 8.78166% |
| 44 | John or Jane Doe | 05/28/42 | M | N | GI Nonsmoker | MONY | 44 | 12/01/96 | 145,203 | 55 | 1 | P2 | 0.00181 | 262.45 | 0.30591% | 9.08757% |
| 45 | John or Jane Doe | 05/19/53 | M | N | GI Nonsmoker | MONY | 45 | 12/01/96 | 317,242 | 44 | 1 | P2 | 0.00081 | 256.97 | 0.29951% | 9.38709% |
| 46 | John or Jane Doe | 04/07/48 | M | N | GI Nonsmoker | MONY | 46 | 12/01/96 | 272,331 | 49 | 1 | P2 | 0.00120 | 326.80 | 0.38091% | 9.76799% |
| 47 | John or Jane Doe | 01/24/34 | M | Y | GI Smoker | MONY | 47 | 12/01/96 | 204,645 | 63 | 1 | P2 | 0.00642 | 1,313.51 | 1.53099% | 11.29898% |
| 48 | John or Jane Doe | 04/28/51 | F | N | GI Nonsmoker | MONY | 48 | 12/01/96 | 114,017 | 46 | 1 | P2 | 0.00068 | 77.82 | 0.09070% | 11.38969% |

FIG. 4C

| Insured | Name | DOB | Sex | Smoke | Class | Ins.Co. | Policy | Issue Date | Assigned | Issue Age | Dur | Policy | E[qx] | Participation Units | Allocation Percentage | Cumulative Allocation % Per Owner |
|---|---|---|---|---|---|---|---|---|---|---|---|---|---|---|---|---|
| 49 | John or Jane Doe | 08/23/37 | M | N | GI Nonsmoker | MONY | 49 | 12/01/96 | 181,536 | 59 | 1 | P2 | 0.00233 | 422.07 | 0.49195% | 11.88164% |
| 50 | John or Jane Doe | 08/08/43 | M | N | GI Nonsmoker | MONY | 50 | 12/01/96 | 212,245 | 53 | 1 | P2 | 0.00155 | 327.92 | 0.38221% | 12.26385% |
| 51 | John or Jane Doe | 02/02/45 | M | N | GI Nonsmoker | MONY | 51 | 12/01/96 | 336,689 | 52 | 1 | P2 | 0.00143 | 479.78 | 0.55922% | 12.82307% |
| 52 | John or Jane Doe | 02/15/34 | M | N | GI Nonsmoker | MONY | 52 | 12/01/96 | 127,041 | 63 | 1 | P2 | 0.00292 | 370.64 | 0.43201% | 13.25508% |
| 53 | John or Jane Doe | 11/18/35 | M | N | GI Nonsmoker | MONY | 53 | 12/01/96 | 313,769 | 61 | 1 | P2 | 0.00253 | 793.05 | 0.92436% | 14.17944% |
| 54 | John or Jane Doe | 04/08/44 | M | N | GI Nonsmoker | MONY | 54 | 12/01/96 | 153,443 | 53 | 1 | P2 | 0.00155 | 237.07 | 0.27632% | 14.45576% |
| 55 | John or Jane Doe | 06/07/40 | F | N | GI Nonsmoker | MONY | 55 | 12/01/96 | 307,389 | 56 | 1 | P2 | 0.00109 | 334.29 | 0.38963% | 14.84539% |
| 56 | John or Jane Doe | 07/24/38 | F | N | GI Nonsmoker | MONY | 56 | 12/01/96 | 183,305 | 58 | 1 | P2 | 0.00122 | 224.09 | 0.26119% | 15.10659% |
| 57 | John or Jane Doe | 08/04/38 | M | N | GI Nonsmoker | MONY | 57 | 12/01/96 | 202,606 | 58 | 1 | P2 | 0.00222 | 449.81 | 0.52428% | 15.63087% |
| 58 | John or Jane Doe | 11/24/32 | M | N | GI Nonsmoker | MONY | 58 | 12/01/96 | 259,696 | 64 | 1 | P2 | 0.00324 | 841.42 | 0.98073% | 16.61160% |
| 59 | John or Jane Doe | 04/25/31 | M | N | GI Nonsmoker | MONY | 59 | 12/01/96 | 346,896 | 66 | 1 | P2 | 0.00399 | 1,384.12 | 1.61328% | 18.22488% |
| 60 | John or Jane Doe | 03/20/42 | M | N | GI Nonsmoker | MONY | 60 | 12/01/96 | 176,056 | 55 | 1 | P2 | 0.00181 | 318.22 | 0.37091% | 18.59579% |
| 61 | John or Jane Doe | 11/01/42 | M | N | GI Nonsmoker | MONY | 61 | 12/01/96 | 110,105 | 54 | 1 | P2 | 0.00167 | 184.15 | 0.21464% | 18.81043% |
| 62 | John or Jane Doe | 01/23/39 | M | N | GI Nonsmoker | MONY | 62 | 12/01/96 | 173,059 | 58 | 1 | P2 | 0.00222 | 384.19 | 0.44780% | 19.25824% |
| 63 | John or Jane Doe | 06/12/50 | M | N | GI Nonsmoker | MONY | 63 | 12/01/96 | 236,380 | 46 | 1 | P2 | 0.00096 | 226.92 | 0.26450% | 19.52273% |
| 64 | John or Jane Doe | 05/05/36 | F | N | GI Nonsmoker | MONY | 64 | 12/01/96 | 222,307 | 61 | 1 | P2 | 0.00151 | 335.13 | 0.39062% | 19.91355% |
| 65 | John or Jane Doe | 03/06/51 | M | N | GI Nonsmoker | MONY | 65 | 12/01/96 | 206,748 | 46 | 1 | P2 | 0.00096 | 198.48 | 0.23134% | 20.14469% |
| 66 | John or Jane Doe | 09/06/48 | M | N | GI Nonsmoker | MONY | 66 | 12/01/96 | 197,369 | 48 | 1 | P2 | 0.00112 | 220.56 | 0.25708% | 20.40177% |
| 67 | John or Jane Doe | 12/24/51 | M | Y | GI Smoker | MONY | 67 | 12/01/96 | 315,812 | 44 | 1 | P2 | 0.00178 | 562.78 | 0.65596% | 21.05772% |
| 68 | John or Jane Doe | 10/22/37 | M | N | GI Nonsmoker | MONY | 68 | 12/01/96 | 241,415 | 59 | 1 | P2 | 0.00233 | 561.29 | 0.65422% | 21.71195% |
| 69 | John or Jane Doe | 11/12/35 | M | Y | GI Smoker | MONY | 69 | 12/01/96 | 104,040 | 61 | 1 | P2 | 0.00556 | 578.51 | 0.67430% | 22.38625% |
| 70 | John or Jane Doe | 08/15/43 | M | N | GI Nonsmoker | MONY | 70 | 12/01/96 | 249,684 | 53 | 1 | P2 | 0.00155 | 385.76 | 0.44963% | 22.83588% |
| 71 | John or Jane Doe | 04/09/40 | M | N | GI Nonsmoker | MONY | 71 | 12/01/96 | 334,901 | 57 | 1 | P2 | 0.00212 | 708.32 | 0.82559% | 23.66147% |
| 72 | John or Jane Doe | 09/17/49 | F | N | GI Nonsmoker | MONY | 72 | 12/01/96 | 329,975 | 47 | 1 | P2 | 0.00072 | 237.58 | 0.27692% | 23.93839% |

FIG. 4D

| Insured | Name | DOB | Sex | Smoke | Class | Ins.Co. | Policy | Issue Date | Assigned | Issue Age | Dur | Policy | E[qx] | Participation Units | Allocation Percentage | Cumulative Allocation % Per Owner |
|---|---|---|---|---|---|---|---|---|---|---|---|---|---|---|---|---|
| 73 | John or Jane Doe | 09/15/32 | M | N | GI Nonsmoker | MONY | 73 | 12/01/96 | 286,574 | 64 | 1 | P2 | 0.00324 | 928.50 | 1.08223% | 25.02062% |
| 74 | John or Jane Doe | 06/23/52 | F | N | GI Nonsmoker | MONY | 74 | 12/01/96 | 338,925 | 44 | 1 | P2 | 0.00061 | 205.90 | 0.23999% | 25.26061% |
| 75 | John or Jane Doe | 02/12/32 | M | N | GI Nonsmoker | MONY | 75 | 12/01/96 | 207,720 | 65 | 1 | P2 | 0.00360 | 747.79 | 0.87160% | 26.13222% |
| 76 | John or Jane Doe | 03/22/30 | M | N | GI Nonsmoker | MONY | 76 | 12/01/96 | 293,719 | 67 | 1 | P2 | 0.00443 | 1,301.91 | 1.51747% | 27.64968% |
| 77 | John or Jane Doe | 08/16/36 | M | N | GI Nonsmoker | MONY | 77 | 12/01/96 | 178,572 | 60 | 1 | P2 | 0.00242 | 432.59 | 0.50422% | 28.15390% |
| 78 | John or Jane Doe | 05/26/51 | M | Y | GI Smoker | MONY | 78 | 12/01/96 | 157,485 | 46 | 1 | P2 | 0.00211 | 332.61 | 0.38768% | 28.54158% |
| 79 | John or Jane Doe | 02/12/33 | F | Y | GI Smoker | MONY | 79 | 12/01/96 | 235,829 | 64 | 1 | P2 | 0.00396 | 933.88 | 1.08851% | 29.63008% |
| 80 | John or Jane Doe | 10/26/45 | M | Y | GI Smoker | MONY | 80 | 12/01/96 | 220,924 | 51 | 1 | P2 | 0.00297 | 656.14 | 0.76478% | 30.39487% |
| 81 | John or Jane Doe | 04/28/45 | M | N | GI Nonsmoker | MONY | 81 | 12/01/96 | 215,446 | 52 | 1 | P3 | 0.00143 | 307.01 | 0.35784% | 0.35784% |
| 82 | John or Jane Doe | 12/12/52 | M | N | GI Nonsmoker | MONY | 82 | 12/01/96 | 141,516 | 43 | 1 | P3 | 0.00074 | 105.08 | 0.12247% | 0.48032% |
| 83 | John or Jane Doe | 04/24/33 | M | N | GI Nonsmoker | MONY | 83 | 12/01/96 | 105,843 | 64 | 1 | P3 | 0.00324 | 342.93 | 0.39971% | 0.88003% |
| 84 | John or Jane Doe | 02/15/39 | M | N | GI Nonsmoker | MONY | 84 | 12/01/96 | 294,566 | 58 | 1 | P3 | 0.00222 | 653.94 | 0.76221% | 1.64224% |
| 85 | John or Jane Doe | 05/08/53 | M | N | GI Nonsmoker | MONY | 85 | 12/01/96 | 157,505 | 44 | 1 | P3 | 0.00081 | 127.58 | 0.14870% | 1.79094% |
| 86 | John or Jane Doe | 06/08/53 | M | N | GI Nonsmoker | MONY | 86 | 12/01/96 | 320,316 | 43 | 1 | P3 | 0.00074 | 237.83 | 0.27721% | 2.06815% |
| 87 | John or Jane Doe | 12/04/51 | F | N | GI Nonsmoker | MONY | 87 | 12/01/96 | 198,683 | 44 | 1 | P3 | 0.00061 | 120.70 | 0.14068% | 2.20884% |
| 88 | John or Jane Doe | 06/03/46 | M | N | GI Nonsmoker | MONY | 88 | 12/01/96 | 153,509 | 50 | 1 | P3 | 0.00128 | 195.72 | 0.22813% | 2.43697% |
| 89 | John or Jane Doe | 01/11/30 | M | N | GI Nonsmoker | MONY | 89 | 12/01/96 | 160,179 | 67 | 1 | P3 | 0.00443 | 709.99 | 0.82755% | 3.26451% |
| 90 | John or Jane Doe | 02/21/48 | M | N | GI Nonsmoker | MONY | 90 | 12/01/96 | 278,419 | 49 | 1 | P3 | 0.00120 | 334.10 | 0.38942% | 3.65394% |
| 91 | John or Jane Doe | 02/17/41 | M | N | GI Nonsmoker | MONY | 91 | 12/01/96 | 281,751 | 56 | 1 | P3 | 0.00196 | 551.53 | 0.64284% | 4.29678% |
| 92 | John or Jane Doe | 06/25/34 | M | N | GI Nonsmoker | MONY | 92 | 12/01/96 | 273,835 | 62 | 1 | P3 | 0.00263 | 718.82 | 0.83783% | 5.13461% |
| 93 | John or Jane Doe | 09/27/44 | F | N | GI Nonsmoker | MONY | 93 | 12/01/96 | 230,018 | 52 | 1 | P3 | 0.00090 | 207.02 | 0.24129% | 5.37590% |
| 94 | John or Jane Doe | 01/17/51 | M | N | GI Nonsmoker | MONY | 94 | 12/01/96 | 308,124 | 46 | 1 | P3 | 0.00096 | 295.80 | 0.34477% | 5.72068% |
| 95 | John or Jane Doe | 10/27/36 | M | N | GI Nonsmoker | MONY | 95 | 12/01/96 | 275,842 | 60 | 1 | P3 | 0.00242 | 668.23 | 0.77887% | 6.49955% |
| 96 | John or Jane Doe | 11/18/51 | M | N | GI Nonsmoker | MONY | 96 | 12/01/96 | 213,718 | 45 | 1 | P3 | 0.00088 | 187.54 | 0.21859% | 6.71813% |

FIG. 4E

| Insured | Name | DOB | Sex | Smoke | Class | Ins.Co. | Policy | Issue Date | Assigned | Issue Age | Dur | Policy | E[qx] | Participation Units | Allocation Percentage | Cumulative Allocation % Per Owner |
|---|---|---|---|---|---|---|---|---|---|---|---|---|---|---|---|---|
| 97 | John or Jane Doe | 01/07/34 | M | N | GI Nonsmoker | MONY | 97 | 12/01/96 | 105,037 | 63 | 1 | P3 | 0.00292 | 306.45 | 0.35718% | 7.07532% |
| 98 | John or Jane Doe | 02/20/51 | M | N | GI Nonsmoker | MONY | 98 | 12/01/96 | 244,195 | 46 | 1 | P3 | 0.00096 | 234.43 | 0.27324% | 7.34856% |
| 99 | John or Jane Doe | 09/13/32 | M | N | GI Nonsmoker | MONY | 99 | 12/01/96 | 333,980 | 64 | 1 | P3 | 0.00324 | 1,082.10 | 1.26126% | 8.60982% |
| 100 | John or Jane Doe | 06/26/42 | M | N | GI Nonsmoker | MONY | 100 | 12/01/96 | 100,108 | 54 | 1 | P3 | 0.00167 | 167.43 | 0.19515% | 8.80497% |
| 101 | John or Jane Doe | 02/20/42 | F | N | GI Nonsmoker | MONY | 101 | 12/01/96 | 149,837 | 55 | 1 | P3 | 0.00104 | 155.08 | 0.18076% | 8.98573% |
| 102 | John or Jane Doe | 02/02/30 | M | Y | GI Smoker | MONY | 102 | 12/01/96 | 193,793 | 67 | 1 | P3 | 0.00975 | 1,889.77 | 2.20266% | 11.18839% |
| 103 | John or Jane Doe | 10/02/44 | M | Y | GI Smoker | MONY | 103 | 12/01/96 | 222,650 | 52 | 1 | P3 | 0.00314 | 698.01 | 0.81358% | 12.00197% |
| 104 | John or Jane Doe | 03/07/38 | M | N | GI Nonsmoker | MONY | 104 | 12/01/96 | 214,827 | 59 | 1 | P3 | 0.00233 | 499.47 | 0.58217% | 12.58414% |
| 105 | John or Jane Doe | 01/25/35 | M | N | GI Nonsmoker | MONY | 105 | 12/01/96 | 231,164 | 62 | 1 | P3 | 0.00263 | 606.81 | 0.70728% | 13.29142% |
| 106 | John or Jane Doe | 12/26/52 | M | N | GI Nonsmoker | MONY | 106 | 12/01/96 | 308,300 | 43 | 1 | P3 | 0.00074 | 228.91 | 0.26681% | 13.55823% |
| 107 | John or Jane Doe | 09/21/41 | M | Y | GI Smoker | MONY | 107 | 12/01/96 | 235,675 | 55 | 1 | P3 | 0.00398 | 937.16 | 1.09233% | 14.65056% |
| 108 | John or Jane Doe | 03/03/42 | M | N | GI Nonsmoker | MONY | 108 | 12/01/96 | 128,087 | 55 | 1 | P3 | 0.00181 | 231.52 | 0.26985% | 14.92041% |
| 109 | John or Jane Doe | 02/21/31 | M | N | GI Nonsmoker | MONY | 109 | 12/01/96 | 153,923 | 66 | 1 | P3 | 0.00399 | 614.15 | 0.71584% | 15.63625% |
| 110 | John or Jane Doe | 06/27/32 | M | N | GI Nonsmoker | MONY | 110 | 12/01/96 | 126,300 | 64 | 1 | P3 | 0.00324 | 409.21 | 0.47697% | 16.11321% |
| 111 | John or Jane Doe | 03/06/49 | F | N | GI Nonsmoker | MONY | 111 | 12/01/96 | 110,387 | 48 | 1 | P3 | 0.00075 | 82.79 | 0.09650% | 16.20971% |
| 112 | John or Jane Doe | 04/21/46 | M | Y | GI Smoker | MONY | 112 | 12/01/96 | 172,647 | 51 | 1 | P3 | 0.00297 | 512.76 | 0.59766% | 16.80737% |
| 113 | John or Jane Doe | 11/10/39 | M | N | GI Nonsmoker | MONY | 113 | 12/01/96 | 323,870 | 60 | 1 | P3 | 0.00212 | 684.99 | 0.79840% | 17.60577% |
| 114 | John or Jane Doe | 01/05/51 | M | N | GI Nonsmoker | MONY | 114 | 12/01/96 | 174,188 | 46 | 1 | P3 | 0.00096 | 167.22 | 0.19491% | 17.80068% |
| 115 | John or Jane Doe | 02/05/43 | M | N | GI Nonsmoker | MONY | 115 | 12/01/96 | 212,308 | 54 | 1 | P3 | 0.00167 | 355.09 | 0.41388% | 18.21456% |
| 116 | John or Jane Doe | 11/17/53 | F | N | GI Nonsmoker | MONY | 116 | 12/01/96 | 150,737 | 43 | 1 | P4 | 0.00057 | 85.92 | 0.10015% | 0.10015% |
| 117 | John or Jane Doe | 06/03/53 | M | N | GI Nonsmoker | MONY | 117 | 12/01/96 | 327,219 | 43 | 1 | P4 | 0.00074 | 242.96 | 0.28319% | 0.38333% |
| 118 | John or Jane Doe | 12/04/35 | M | N | GI Nonsmoker | MONY | 118 | 12/01/96 | 207,657 | 60 | 1 | P4 | 0.00242 | 503.05 | 0.58634% | 0.96967% |
| 119 | John or Jane Doe | 01/17/52 | M | N | GI Nonsmoker | MONY | 119 | 12/01/96 | 234,766 | 45 | 1 | P4 | 0.00088 | 206.01 | 0.24012% | 1.20979% |
| 120 | John or Jane Doe | 04/19/45 | M | N | GI Nonsmoker | MONY | 120 | 12/01/96 | 109,494 | 52 | 1 | P4 | 0.00143 | 156.03 | 0.18186% | 1.39165% |

FIG. 4F

| Insured | Name | DOB | Sex | Smoke | Class | Ins.Co. | Policy | Issue Date | Assigned | Issue Age | Dur | Policy | E[qx] | Participation Units | Allocation Percentage | Cumulative Allocation % Per Owner |
|---|---|---|---|---|---|---|---|---|---|---|---|---|---|---|---|---|
| 121 | John or Jane Doe | 04/21/41 | M | N | GI Nonsmoker | MONY | 121 | 12/01/96 | 162,661 | 56 | 1 | P4 | 0.00196 | 318.41 | 0.37113% | 1.76278% |
| 122 | John or Jane Doe | 09/11/49 | M | N | GI Nonsmoker | MONY | 122 | 12/01/96 | 235,742 | 47 | 1 | P4 | 0.00104 | 245.76 | 0.28645% | 2.04923% |
| 123 | John or Jane Doe | 09/27/30 | M | N | GI Nonsmoker | MONY | 123 | 12/01/96 | 250,291 | 66 | 1 | P4 | 0.00399 | 998.66 | 1.16401% | 3.21324% |
| 124 | John or Jane Doe | 09/24/38 | F | Y | GI Smoker | MONY | 124 | 12/01/96 | 278,520 | 58 | 1 | P4 | 0.00269 | 749.08 | 0.87311% | 4.08635% |
| 125 | John or Jane Doe | 07/20/37 | M | N | GI Nonsmoker | MONY | 125 | 12/01/96 | 234,436 | 59 | 1 | P4 | 0.00233 | 545.06 | 0.63531% | 4.72166% |
| 126 | John or Jane Doe | 10/01/38 | M | N | GI Nonsmoker | MONY | 126 | 12/01/96 | 306,179 | 58 | 1 | P4 | 0.00222 | 679.72 | 0.79226% | 5.51392% |
| 127 | John or Jane Doe | 10/24/45 | F | Y | GI Smoker | MONY | 127 | 12/01/96 | 334,902 | 51 | 1 | P4 | 0.00190 | 635.48 | 0.74069% | 6.25461% |
| 128 | John or Jane Doe | 01/20/49 | M | N | GI Nonsmoker | MONY | 128 | 12/01/96 | 334,200 | 48 | 1 | P4 | 0.00112 | 373.47 | 0.43530% | 6.68992% |
| 129 | John or Jane Doe | 03/15/45 | M | N | GI Nonsmoker | MONY | 129 | 12/01/96 | 284,095 | 52 | 1 | P4 | 0.00143 | 404.84 | 0.47186% | 7.16178% |
| 130 | John or Jane Doe | 02/27/42 | M | N | GI Nonsmoker | MONY | 130 | 12/01/96 | 176,898 | 55 | 1 | P4 | 0.00181 | 319.74 | 0.37268% | 7.53446% |
| 131 | John or Jane Doe | 06/22/39 | M | N | GI Nonsmoker | MONY | 131 | 12/01/96 | 264,129 | 57 | 1 | P4 | 0.00212 | 558.63 | 0.65113% | 8.18559% |
| 132 | John or Jane Doe | 06/19/51 | M | Y | GI Smoker | MONY | 132 | 12/01/96 | 104,835 | 45 | 1 | P4 | 0.00193 | 202.38 | 0.23589% | 8.42148% |
| 133 | John or Jane Doe | 08/28/35 | M | N | GI Nonsmoker | MONY | 133 | 12/01/96 | 111,793 | 61 | 1 | P4 | 0.00253 | 282.56 | 0.32934% | 8.75082% |
| 134 | John or Jane Doe | 10/08/36 | M | N | GI Nonsmoker | MONY | 134 | 12/01/96 | 299,816 | 60 | 1 | P4 | 0.00242 | 726.30 | 0.84656% | 9.59738% |
| 135 | John or Jane Doe | 02/12/45 | F | N | GI Nonsmoker | MONY | 135 | 12/01/96 | 153,060 | 52 | 1 | P4 | 0.00090 | 137.75 | 0.16056% | 9.75794% |
| 136 | John or Jane Doe | 08/06/34 | M | N | GI Nonsmoker | MONY | 136 | 12/01/96 | 121,159 | 62 | 1 | P4 | 0.00263 | 318.04 | 0.37070% | 10.12864% |
| 137 | John or Jane Doe | 02/26/47 | M | N | GI Nonsmoker | MONY | 137 | 12/01/96 | 215,937 | 50 | 1 | P4 | 0.00128 | 275.32 | 0.32090% | 10.44955% |
| 138 | John or Jane Doe | 09/14/45 | M | N | GI Nonsmoker | MONY | 138 | 12/01/96 | 136,763 | 51 | 1 | P4 | 0.00135 | 184.63 | 0.21520% | 10.66475% |
| 139 | John or Jane Doe | 06/06/44 | M | Y | GI Smoker | MONY | 139 | 12/01/96 | 210,830 | 52 | 1 | P4 | 0.00314 | 660.95 | 0.77039% | 11.43514% |
| 140 | John or Jane Doe | 11/08/54 | M | N | GI Nonsmoker | MONY | 140 | 12/01/96 | 308,111 | 42 | 1 | P4 | 0.00069 | 212.60 | 0.24780% | 11.68293% |
| 141 | John or Jane Doe | 01/15/32 | M | N | GI Nonsmoker | MONY | 141 | 12/01/96 | 317,801 | 65 | 1 | P4 | 0.00360 | 1,144.08 | 1.33351% | 13.01644% |
| 142 | John or Jane Doe | 02/17/35 | F | N | GI Nonsmoker | MONY | 142 | 12/01/96 | 176,234 | 62 | 1 | P4 | 0.00161 | 284.18 | 0.33123% | 13.34767% |
| 143 | John or Jane Doe | 02/11/37 | M | N | GI Nonsmoker | MONY | 143 | 12/01/96 | 104,362 | 60 | 1 | P4 | 0.00242 | 252.82 | 0.29468% | 13.64235% |
| 144 | John or Jane Doe | 12/27/31 | M | N | GI Nonsmoker | MONY | 144 | 12/01/96 | 156,389 | 64 | 1 | P4 | 0.00324 | 506.70 | 0.59060% | 14.23294% |

FIG. 4G

| Insured | Name | DOB | Sex | Smoke | Class | Ins.Co. | Policy | Issue Date | Assigned | Issue Age | Dur | Policy | E[qx] | Participation Units | Allocation Percentage | Cumulative Allocation % Per Owner |
|---|---|---|---|---|---|---|---|---|---|---|---|---|---|---|---|---|
| 145 | John or Jane Doe | 03/22/43 | M | N | GI Nonsmoker | MONY | 145 | 12/01/96 | 315,276 | 54 | 1 | P4 | 0.00167 | 527.30 | 0.61460% | 14.84755% |
| 146 | John or Jane Doe | 10/01/33 | M | N | GI Nonsmoker | MONY | 146 | 12/01/96 | 227,017 | 63 | 1 | P4 | 0.00292 | 662.32 | 0.77198% | 15.61953% |
| 147 | John or Jane Doe | 11/13/52 | M | Y | GI Smoker | MONY | 147 | 12/01/96 | 109,848 | 44 | 1 | P4 | 0.00178 | 195.75 | 0.22816% | 15.84769% |
| 148 | John or Jane Doe | 11/20/52 | M | N | GI Nonsmoker | MONY | 148 | 12/01/96 | 111,889 | 44 | 1 | P4 | 0.00081 | 90.63 | 0.10564% | 15.95333% |
| 149 | John or Jane Doe | 07/24/39 | F | N | GI Nonsmoker | MONY | 149 | 12/01/96 | 165,590 | 57 | 1 | P4 | 0.00113 | 187.53 | 0.21858% | 16.17191% |
| 150 | John or Jane Doe | 09/08/43 | M | N | GI Nonsmoker | MONY | 150 | 12/01/96 | 208,267 | 53 | 1 | P4 | 0.00155 | 321.77 | 0.37505% | 16.54696% |
| 151 | John or Jane Doe | 03/13/36 | M | N | GI Nonsmoker | MONY | 151 | 12/01/96 | 228,940 | 61 | 1 | P5 | 0.00253 | 578.65 | 0.67445% | 0.67445% |
| 152 | John or Jane Doe | 04/01/43 | M | N | GI Nonsmoker | MONY | 152 | 12/01/96 | 182,297 | 54 | 1 | P5 | 0.00167 | 304.89 | 0.35537% | 1.02983% |
| 153 | John or Jane Doe | 07/18/34 | M | N | GI Nonsmoker | MONY | 153 | 12/01/96 | 264,844 | 62 | 1 | P5 | 0.00263 | 695.22 | 0.81032% | 1.84015% |
| 154 | John or Jane Doe | 01/17/35 | M | N | GI Nonsmoker | MONY | 154 | 12/01/96 | 132,245 | 62 | 1 | P5 | 0.00263 | 347.14 | 0.40462% | 2.24477% |
| 155 | John or Jane Doe | 06/23/44 | M | N | GI Nonsmoker | MONY | 155 | 12/01/96 | 286,740 | 52 | 1 | P5 | 0.00143 | 408.60 | 0.47626% | 2.72103% |
| 156 | John or Jane Doe | 06/25/49 | M | N | GI Nonsmoker | MONY | 156 | 12/01/96 | 135,760 | 47 | 1 | P5 | 0.00104 | 141.53 | 0.16496% | 2.88599% |
| 157 | John or Jane Doe | 04/02/38 | M | N | GI Nonsmoker | MONY | 157 | 12/01/96 | 117,460 | 59 | 1 | P5 | 0.00233 | 273.09 | 0.31831% | 3.20430% |
| 158 | John or Jane Doe | 10/18/41 | F | N | GI Nonsmoker | MONY | 158 | 12/01/96 | 289,461 | 55 | 1 | P5 | 0.00104 | 299.59 | 0.34920% | 3.55350% |
| 159 | John or Jane Doe | 07/07/30 | F | N | GI Nonsmoker | MONY | 159 | 12/01/96 | 119,042 | 66 | 1 | P5 | 0.00200 | 238.38 | 0.27785% | 3.83135% |
| 160 | John or Jane Doe | 02/04/42 | M | N | GI Nonsmoker | MONY | 160 | 12/01/96 | 123,830 | 55 | 1 | P5 | 0.00181 | 223.82 | 0.26088% | 4.09223% |
| 161 | John or Jane Doe | 09/08/40 | M | N | GI Nonsmoker | MONY | 161 | 12/01/96 | 100,135 | 56 | 1 | P5 | 0.00196 | 196.01 | 0.22847% | 4.32070% |
| 162 | John or Jane Doe | 10/06/35 | F | N | GI Nonsmoker | MONY | 162 | 12/01/96 | 108,497 | 61 | 1 | P5 | 0.00151 | 163.56 | 0.19064% | 4.51134% |
| 163 | John or Jane Doe | 05/22/39 | M | N | GI Nonsmoker | MONY | 163 | 12/01/96 | 150,098 | 58 | 1 | P5 | 0.00222 | 333.22 | 0.38839% | 4.89973% |
| 164 | John or Jane Doe | 06/11/32 | M | N | GI Nonsmoker | MONY | 164 | 12/01/96 | 344,754 | 64 | 1 | P5 | 0.00324 | 1,117.00 | 1.30195% | 6.20167% |
| 165 | John or Jane Doe | 11/05/44 | M | N | GI Nonsmoker | MONY | 165 | 12/01/96 | 176,483 | 52 | 1 | P5 | 0.00143 | 251.49 | 0.29313% | 6.49480% |
| 166 | John or Jane Doe | 06/04/46 | F | Y | GI Smoker | MONY | 166 | 12/01/96 | 288,729 | 50 | 1 | P5 | 0.00182 | 524.04 | 0.61081% | 7.10561% |
| 167 | John or Jane Doe | 10/20/50 | M | N | GI Nonsmoker | MONY | 167 | 12/01/96 | 301,935 | 46 | 1 | P5 | 0.00096 | 289.86 | 0.33785% | 7.44346% |
| 168 | John or Jane Doe | 10/11/47 | M | N | GI Nonsmoker | MONY | 168 | 12/01/96 | 261,886 | 46 | 1 | P5 | 0.00120 | 314.26 | 0.36630% | 7.80976% |

FIG. 4H

| Insured | Name | DOB | Sex | Smoke | Class | Ins.Co. | Policy | Issue Date | Assigned | Issue Age | Dur | Policy | E[qx] | Participation Units | Allocation Percentage | Cumulative Allocation % Per Owner |
|---|---|---|---|---|---|---|---|---|---|---|---|---|---|---|---|---|
| 169 | John or Jane Doe | 09/10/45 | M | N | GI Nonsmoker | MONY | 169 | 12/01/96 | 155,387 | 51 | 1 | P5 | 0.00135 | 209.77 | 0.24450% | 8.05426% |
| 170 | John or Jane Doe | 05/12/54 | F | N | GI Nonsmoker | MONY | 170 | 12/01/96 | 230,139 | 43 | 1 | P5 | 0.00057 | 131.18 | 0.15290% | 8.20716% |
| 171 | John or Jane Doe | 06/13/45 | M | N | GI Nonsmoker | MONY | 171 | 12/01/96 | 336,120 | 51 | 1 | P5 | 0.00135 | 453.76 | 0.52889% | 8.73605% |
| 172 | John or Jane Doe | 04/27/44 | M | N | GI Nonsmoker | MONY | 172 | 12/01/96 | 307,888 | 53 | 1 | P5 | 0.00155 | 475.69 | 0.55445% | 9.29050% |
| 173 | John or Jane Doe | 06/24/50 | M | Y | GI Smoker | MONY | 173 | 12/01/96 | 309,424 | 46 | 1 | P5 | 0.00211 | 653.50 | 0.76170% | 10.05220% |
| 174 | John or Jane Doe | 04/03/32 | M | N | GI Nonsmoker | MONY | 174 | 12/01/96 | 132,496 | 65 | 1 | P5 | 0.00360 | 476.99 | 0.55596% | 10.60816% |
| 175 | John or Jane Doe | 05/10/50 | M | N | GI Nonsmoker | MONY | 175 | 12/01/96 | 255,439 | 47 | 1 | P5 | 0.00104 | 266.30 | 0.31039% | 10.91855% |
| 176 | John or Jane Doe | 11/21/43 | M | N | GI Nonsmoker | MONY | 176 | 12/01/96 | 304,699 | 53 | 1 | P5 | 0.00155 | 470.76 | 0.54870% | 11.46725% |
| 177 | John or Jane Doe | 08/13/52 | F | N | GI Nonsmoker | MONY | 177 | 12/01/96 | 215,717 | 44 | 1 | P5 | 0.00061 | 131.05 | 0.15275% | 11.62000% |
| 178 | John or Jane Doe | 09/16/38 | M | N | GI Nonsmoker | MONY | 178 | 12/01/96 | 201,298 | 58 | 1 | P5 | 0.00222 | 446.88 | 0.52087% | 12.14087% |
| 179 | John or Jane Doe | 02/28/43 | M | N | GI Nonsmoker | MONY | 179 | 12/01/96 | 106,011 | 54 | 1 | P5 | 0.00167 | 177.30 | 0.20666% | 12.34753% |
| 180 | John or Jane Doe | 06/14/40 | M | N | GI Nonsmoker | MONY | 180 | 12/01/96 | 117,271 | 56 | 1 | P5 | 0.00196 | 229.56 | 0.26757% | 12.61510% |
| 181 | John or Jane Doe | 03/01/54 | M | N | GI Nonsmoker | MONY | 181 | 12/01/96 | 115,403 | 43 | 1 | P5 | 0.00074 | 85.69 | 0.09987% | 12.71497% |
| 182 | John or Jane Doe | 10/22/47 | M | N | GI Nonsmoker | MONY | 182 | 12/01/96 | 219,451 | 49 | 1 | P5 | 0.00120 | 263.34 | 0.30694% | 13.02191% |
| 183 | John or Jane Doe | 08/21/48 | M | Y | GI Smoker | MONY | 183 | 12/01/96 | 207,163 | 48 | 1 | P5 | 0.00246 | 509.31 | 0.59364% | 13.61555% |
| 184 | John or Jane Doe | 09/25/37 | F | N | GI Nonsmoker | MONY | 184 | 12/01/96 | 181,957 | 59 | 1 | P5 | 0.00131 | 238.82 | 0.27836% | 13.89391% |
| 185 | John or Jane Doe | 06/25/44 | M | N | GI Nonsmoker | MONY | 185 | 12/01/96 | 294,076 | 52 | 1 | P5 | 0.00143 | 419.06 | 0.48844% | 14.38235% |
| 186 | John or Jane Doe | 01/19/48 | M | N | GI Nonsmoker | MONY | 186 | 12/01/96 | 171,971 | 49 | 1 | P5 | 0.00120 | 206.37 | 0.24053% | 14.62289% |
| 187 | John or Jane Doe | 10/13/51 | M | N | GI Nonsmoker | MONY | 187 | 12/01/96 | 203,725 | 45 | 1 | P5 | 0.00088 | 178.77 | 0.20837% | 14.83126% |
| 188 | John or Jane Doe | 05/24/35 | M | N | GI Nonsmoker | MONY | 188 | 12/01/96 | 141,342 | 62 | 1 | P5 | 0.00263 | 371.02 | 0.43245% | 15.26371% |
| 189 | John or Jane Doe | 10/03/50 | M | N | GI Nonsmoker | MONY | 189 | 12/01/96 | 178,026 | 46 | 1 | P5 | 0.00096 | 170.90 | 0.19920% | 15.46291% |
| 190 | John or Jane Doe | 08/02/30 | F | N | GI Nonsmoker | MONY | 190 | 12/01/96 | 218,404 | 66 | 1 | P5 | 0.00200 | 437.35 | 0.50977% | 15.97268% |
| 191 | John or Jane Doe | 12/12/39 | M | N | GI Nonsmoker | MONY | 191 | 06/01/97 | 101,090 | 58 | 1 | P6 | 0.00222 | 224.42 | 0.26158% | 0.26158% |
| 192 | John or Jane Doe | 11/05/47 | M | N | GI Nonsmoker | MONY | 192 | 06/01/97 | 161,239 | 49 | 1 | P6 | 0.00120 | 193.49 | 0.22552% | 0.48710% |

FIG. 4I

| Insured | Name | DOB | Sex | Smoke | Class | Ins.Co. | Policy | Issue Date | Assigned | Issue Age | Dur | Policy | E[qx] | Participation Units | Allocation Percentage | Cumulative Allocation % Per Owner |
|---|---|---|---|---|---|---|---|---|---|---|---|---|---|---|---|---|
| 193 | John or Jane Doe | 07/23/54 | M | N | GI Nonsmoker | MONY | 193 | 06/01/97 | 339,852 | 42 | 1 | P6 | 0.00069 | 234.50 | 0.27332% | 0.76042% |
| 194 | John or Jane Doe | 06/23/30 | M | Y | GI Smoker | MONY | 194 | 06/01/97 | 288,260 | 66 | 1 | P6 | 0.00878 | 2,530.35 | 2.94930% | 3.70972% |
| 195 | John or Jane Doe | 11/21/52 | F | N | GI Nonsmoker | MONY | 195 | 06/01/97 | 183,910 | 44 | 1 | P6 | 0.00061 | 111.73 | 0.13022% | 3.83995% |
| 196 | John or Jane Doe | 02/23/49 | M | Y | GI Smoker | MONY | 196 | 06/01/97 | 113,865 | 48 | 1 | P6 | 0.00246 | 249.94 | 0.32629% | 4.16623% |
| 197 | John or Jane Doe | 02/20/40 | M | N | GI Nonsmoker | MONY | 197 | 06/01/97 | 123,865 | 57 | 1 | P6 | 0.00212 | 261.97 | 0.30535% | 4.47158% |
| 198 | John or Jane Doe | 07/23/50 | M | N | GI Nonsmoker | MONY | 198 | 06/01/97 | 182,888 | 46 | 1 | P6 | 0.00096 | 175.57 | 0.20464% | 4.67623% |
| 199 | John or Jane Doe | 12/14/37 | M | N | GI Nonsmoker | MONY | 199 | 06/01/97 | 195,087 | 60 | 1 | P6 | 0.00242 | 472.60 | 0.55085% | 5.22707% |
| 200 | John or Jane Doe | 11/18/49 | M | N | GI Nonsmoker | MONY | 200 | 06/01/97 | 211,290 | 47 | 1 | P6 | 0.00104 | 220.27 | 0.25674% | 5.48381% |

85,794.84

SYSTEM AND METHOD FOR ASSURING PREDICTABLE GAINS

BACKGROUND OF THE INVENTION

I. Field of the Invention

The present invention generally relates to a system and method for achieving predictable amounts of incoming funds from an otherwise relatively unpredictable source. By utilizing this inventive system and method, a business concern can more efficiently manage its finances.

II. Description of the Prior Art

The element of "Risk" exists in a multitude of forms in the daily life of every person. A variety of instruments, financial and non-financial, have through the years been developed to assess and to indemnify and protect against these risk factors. Many of these instruments have, in the past, been developed as insurance products. Such insurance products have been specifically created, for example, to indemnify the risk associated with the unexpected loss of human life. These specific insurance instruments are known as life insurance policies.

The many different types of life insurance policies assess and charge for this indemnification utilizing, among other resources, tables of mortality statistics that are based on empirically expected numbers of deaths occurring within large pools of people. In short, by virtue of actuarially driven premium payments, life insurance allows for the indemnification of the unexpected loss of human life by the receipt of death benefits. The premiums developed allow for "spreading" of these risks over large pools of insureds.

Although insurance premiums in general, and life insurance premiums in particular, allow for this spreading of uncertainty, no system has been developed which allows for a different type of problem of uncertainty. This is the problem of not knowing when one may receive incoming funds from an unpredictable source. This lack of knowledge translates into large costs for example, costs associated with interest rates because funds must often be borrowed to account for cash and investment shortfalls, costs associated with deferring certain investments and purchases that are badly needed by a corporation (or individual), and other attendant costs associated with the lack of needed and necessary funds.

Institutions obtain through purchases, assignment or other ownership vehicles, ownership of life insurance coverage on the lives of people with whom they have an insurable interest. If these institutions, as policy holders of the life insurance policies, own too few policies, they are uncertain about when these policies will pay death benefits.

If the number of lives that are covered by those who purchased life insurance policies are too small to fall within numbers that could yield predictability about the timing of incoming death benefits, this creates an uncertainty as to the receipt of funds to the institution. If the institution's receipt of funds is uncertain then the aforementioned, concomitant financial difficulties arise. The financial probity of the institution can be more adequately assured if the mechanism of the present invention can be applied. This will result in a greater degree of statistical probability of incoming funds for those institutions using the invention herein described.

There is therefore a great need in the art for making predictable, an otherwise unpredictable date of receiving funds. Accordingly, there is now provided with this invention a system and method for assuring otherwise unpredictable gains and for effectively overcoming the aforementioned difficulties and longstanding problems inherent in managing unpredictable inflows of funds. These problems have been solved in a simple, convenient, and highly effective way by which to assure a predictable inflow of funds. More particularly, the system and method of the present invention allows the owners of risk spreading insurance to formulate predictable patterns of the inflow of indemnification funds so as to enable those owners to realistically assess the financial impact of the risk spreading process. Additional objects of the present invention will become apparent from the following description.

SUMMARY OF THE PRESENT INVENTION

The method and system of the present invention is developed to be the opposite of risk spreading insurance. If insurance is designed to spread risk, the present invention has been designed to divide gain by applying those very same mortality tables to divide gains within a pool of many people.

As will be appreciated by those persons skilled in the art, a major advantage provided by the present invention is to make otherwise unpredictable inflows of funds more predictable. It is therefore an object of the present invention to provide for an investment and receiving vehicle which can function as a pool of incoming funds to be shared by parties associated with the pool. It is another object to associate a statistical table with the pool in order to assess the amounts allocated to those parties associated with the pool.

The method of the present invention is generally directed to distributing proceeds from a financial vehicle to participants thereof. The proceeds typically come from an insurance policy. The method comprises enrolling a participant in the vehicle, wherein said participant owns at least one of the insurance policies. This insurance policy is on a predetermined statistical probability of an event occurrence associated therewith. This statistical probability is based upon a predetermined criteria. The method also comprises assigning proceeds to the vehicle; and receiving and applying the proceeds from the policy to the vehicle upon the occurrence of the event. The method further comprises distributing the proceeds from the vehicle to a participant based upon the relative statistical probability of the policy to other policies in the vehicle.

The method and apparatus of the present invention will be better understood by reference to the following detailed discussion of specific embodiments and the attached figures which illustrate and exemplify such embodiments.

DESCRIPTION OF THE DRAWINGS

A specific embodiment of the present invention will be described with reference to the following drawings, wherein:

FIG. 3 illustrates the receiving/investment vehicle database.

FIG. 4 illustrates a representative example of the receiving/investment vehicle database with exemplary data.

DESCRIPTION OF THE PREFERRED EMBODIMENT

The following preferred embodiment as exemplified by the drawings is illustrative of the invention and is not intended to limit the invention as encompassed by the claims of this application. A system and method for making unpredictable receipts of funds more predictable is disclosed herein.

Figure 1:
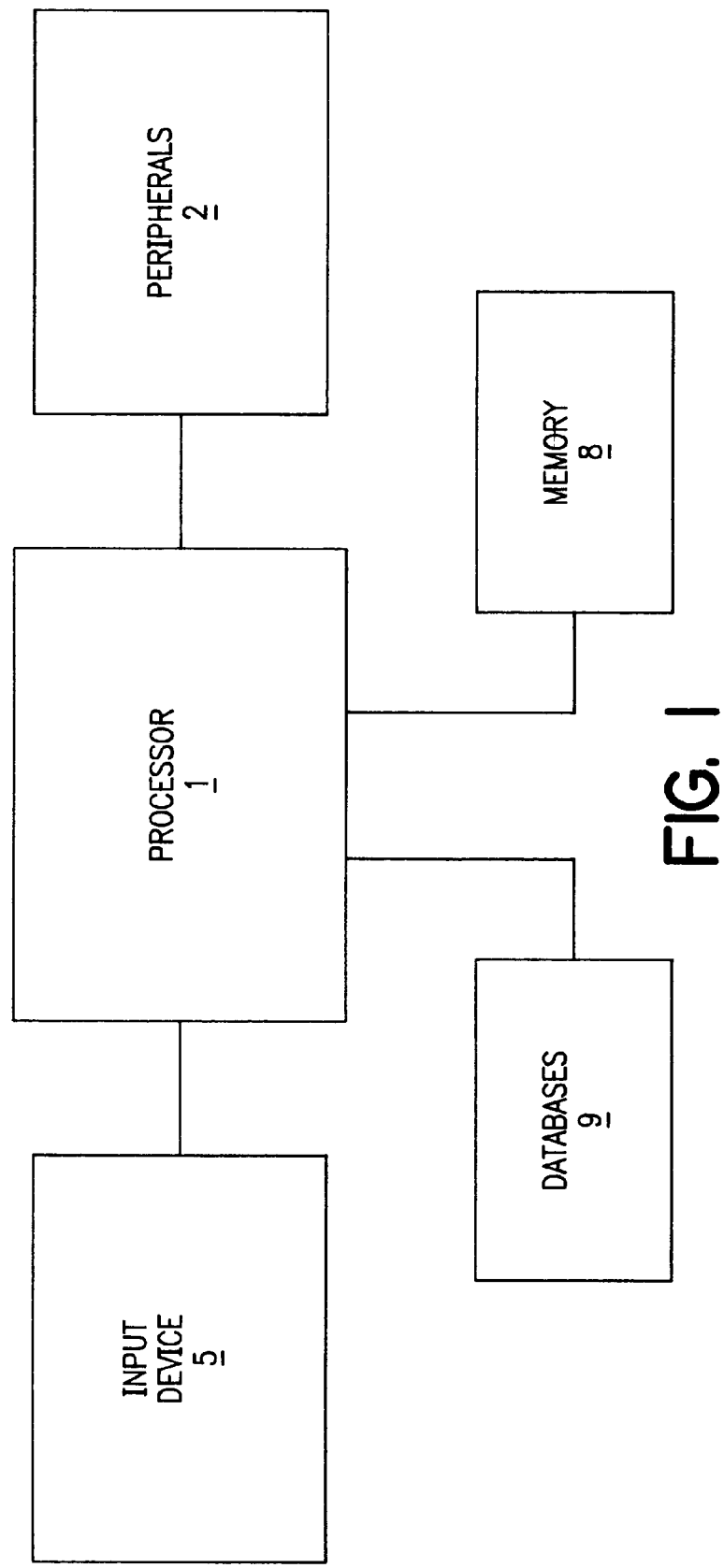
FIG. 1 is an overview of the system in which a preferred embodiment of the present invention is illustrated.

FIG. 1 illustrates an overview of the system in which a preferred embodiment of the present invention is used. FIG. 1 shows a processor 1, which can be one or more computers operated by a user of the present invention. It may include one computer or multiple computers which are located at one physical location. Alternatively, the processor may include multiple computers which are networked together across multiple physical locations. In this way, as is well known in the art, memory and processing may be distributed among the computers which make up the processor 1.

Associated with the processor 1, is an input device 5, for inputting data to the processor. Peripherals 2 may also be connected to the processor, as desired. Memory 8 may also be associated with the processor, as is well known in the art. The memory 8, typically, is machine readable media. Such media include, as is well known in the art, magnetic and/or optical media such as a hard disk, optical disk, floppy disk, tape, random access memory, read only memory, and/or any combination thereof. The memory (or portions thereof) may reside on a single computer, or may be distributed among the processors which make up the system of the present invention. A database, here, designated as the Receiving/Investment vehicle database, (R/I database), is accessible and is associated with the processor. The connections between the processor 1 and its input device 5, its peripherals 6, the RAM/ROM 5, and the R/I database 9 are well known in the art and are therefore not further described here.

Figure 2:
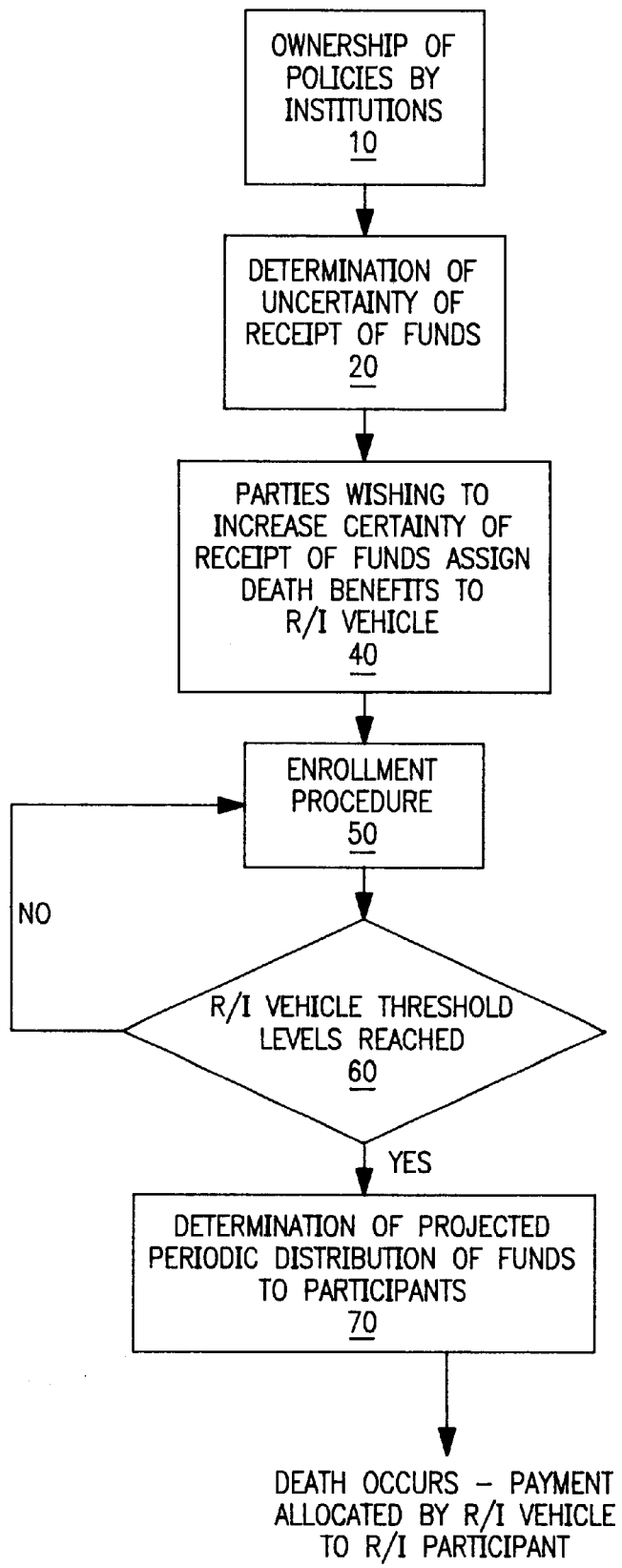
FIG. 2 is a flow diagram illustrating the system and method of the present invention.

The system, as generally illustrated in FIG. 2, shows the method for making unpredictable receipts of funds more predictable. This system was developed to allow small groups of insured people to have the predictability of inflow that large groups of insured people have through the use of a vehicle that allows for the combinations of these small groups and enabling the application of "large group" statistics to the combination.

Thus small corporations, associations or other organized groups can achieve the same planning advantages of their larger counterparts.

Ideally, a group of insureds should be populated to the extent that some mortality will be reasonably assured to occur within the first enrollment period. Obviously the business need to get the pool started means that this ideal may take some time to be achieved. Thus, a minimum number of insureds must be established in order to get things started. Concomitantly, a minimum time period whereby mortality is expected to occur must also be designated.

Given the fact that most small insured groups, outside of the pool, generally cannot reasonably expect mortality to assure until 15 to 30 years have elapsed the business decision has been made that the initial pool of insureds should be of such a size that mortality and death benefit proceeds distribution should reasonably be expected to commence in a three year time period.

Enrollment of additional participants will proceed at a pace that should shorten this time period so that benefits will be distributed within the first—enrollment to distribution—period.

Following FIG. 2, as shown in steps 10 and 20, depending upon the number of insureds owned by the institution, a statistical determination of the uncertainty of the receipt of funds by that institution is made. This determination is made by computing the likelihood of receiving death benefits from any of the policies owned. When dealing with a group composed of a small number of insureds, such as 5, 25, or even 50 to 100 lives, statistical determinations as to short term mortality probabilities are extremely inaccurate. Thus, financial planning must be based on individual statistical assumptions which mandate long range life expectancy (such as death at 78–86) which are generally accepted industry assumptions and are used to illustrate assumed individual mortality.

Such determination is made for a predetermined period of time, for example, one year. Such determination can be made using either hardware or software configured for this purpose. If such uncertainty is deemed to be unacceptable, then the system and method of the present invention is applicable to the institution desirous of more certainty. The acceptability or unacceptability is made at a threshold level by the institution. In any event, in order to decrease the uncertainty of receiving funds, from death benefits for example, the system and method of the present invention is applied to the institution.

To apply the present invention to an institution desirous of reducing the uncertainty of receiving funds, an receiving/investment vehicle is established. Such establishment may be made at any point prior to receiving funds. The receiving/investment vehicle is preferentially established to receive death benefits assigned to the vehicle from participating entities. Several vehicles may be used, for example, a unit investment trust, a grantor trust, or other known vehicles as is well known by those skilled in the financial and investment arts. Of course, other receiving/investment vehicles may be used if other financial considerations are taken into account. Nevertheless, when such receiving/investment vehicles are established, a minimum number of insureds should be determined in order for that vehicle to operate. This determination is made by calculating the degree of certainty that the vehicle will receive funds within a predetermined period of time.

Death benefits owned by the policy holders are assigned to the receiving/investment vehicle 40. Such assignment may be made by a collateral assignment, or direct policy assignment, as is well known by those skilled in the art. Such assignments are envisioned and are preferred to be wholly assigned. However, the present invention contemplates any level of assignment of the receipt of a benefit under an insurance policy to the receiving/investment vehicle (the R/I vehicle). By virtue of this assignment, the insurance carrier will be notified to forward any death benefit claimed directly to the R/I vehicle administrator.

Typically, a trust administrator oversees and administers the workings of the R/I vehicle, as is well known in the art. Alternatively, the R/I vehicle may be operated by one of parties. Such administration of the vehicle can be done in a variety of ways, all of which are deemed to be covered by the present invention. Such terms of the assignment of proceeds received to the R/I vehicle typically include restrictions, for example, termination of the assignment agreements, any of the ownership provisions, and its concomitant distribution methodology based on published designated formula, an agreement to assign the investment authority to the trust, an agreement to contribute to the administrative costs pursuant to the published cost structure, an agreement to allow additional participants at agreed upon intervals and methods, and other possible agreements. These terms are all included in a participation agreement between the parties wishing to increase the certainty of receiving funds from uncertain sources, (in this particular embodiment, from death benefits received from life insurance policies).

An enrollment procedure 50 and 60, is then carried out which enrolls the entities wishing to increase their certainty of recovering funds as participants to the R/I vehicle. During this process it may be necessary to include a pre-enrollment procedure in which those wishing to participate are first aligned in order to assure the necessary number of participating entities needed. As part of the enrollment procedure, necessary information is entered into a database which tabulates this data for each participant. This database can be in the form of hardware or software as is well known in the art. Typically, for each participating institution, the number of insureds to be applied to the R/I vehicle is entered, the amount of coverage of each insured is allocated to the vehicle, the expected mortality of each insured is entered, the minimum and expected participation period and alternatively, the social security number is entered. Other entered data include, for example, underwriting class (guaranteed or non-guaranteed fully underwritten insurance), underwriting category (standard or substandard), age, sex, and smoking status.

With this knowledge, a participant may now forego the improbable possibility of receipt of a windfall (e.g. receipt of a death benefit) in favor of projected smaller, but more predictable, streams of inflow 70. To make the present invention profitable, minimum enrollment requirements may be established, for example, a minimum amount of insurance per life, the total amount of insurance per institution, etc. (50) Such criteria may be embedded within the program, or, may be a separate database, for example R/I vehicle database 9, in which the institutional data is entered.

The preferred embodiment of the processor invention includes a receiving/investment database 9, as illustrated in FIG. 3. While the following description refers to a specific individual database, format, records, fields, and indexing schemes, those skilled in the art will readily appreciate that such specifics are not critical to the present invention. Of course, such a database may be in the form of either hardware or software.

Referring to FIG. 3, the R/I vehicle database 9 is depicted in detail. This database typically stores data relating to individual insureds whose policies, or portions of policies have been assigned to the R/I vehicle. The rows and columns of the database 9 represent records and fields of the database, respectively. Of course, other records and fields in this (or other) databases may be used as desired.

As shown in FIG. 3, a record of the R/I vehicle database 9 typically includes the fields 9A–9Q. The field 9A, entitled "Participant Number" stores the number which identifies the participating institutions in the R/I vehicle. This is a unique number which is associated with each participant. The field 9B, entitled "Insureds Number" stores the number associated with each insured party. Each insured has a unique number associated with the R/I vehicle. The field 9C, entitled "Insured's Name" stores the name of the insured party. The field 9D, entitled "Date of Birth" stores the insured's date of birth. The field 9E, entitled "Sex" stores the gender of the insured. The field 9F, entitled "Smoking Status" stores the information identifying whether or not the insured is a smoker. The field 9G, entitled "Class" stores the classification of underwriting associated with that insured. The field 9H, entitled "Insurance Carrier" stores the name of the insurance company carrying the policy of that insured party. The field 9I, entitled "Policy Number" stores the carrier's unique number for the policy covering that insured party. The field 9J, entitled "Issue Date" stores the date the policy issued. The field 9K, entitled "Assigned Death Benefit" stores the dollar amount that the participant has assigned from the insured's policy to the R/I vehicle. The field 9L, entitled "Issue Age" stores the age of the insured on the date the policy issued. The field 9M, entitled "Duration" stores the time that the policy has been in force, in years. The field 9N, entitled "Policy Owner" stores the participant associated with that insured party. The field 9O, entitled "Participation Units" stores the number of units that each participant has in the R/I vehicle. The field 9P, entitled "Allocation Percentage" stores the percentage that participant has allocated in the R/I vehicle. The field 9Q, entitled "Cumulative Allocation Percentage Per Owner" stores the running total as a percent of the allocation that each participant has in the R/I vehicle.

Once there are enough insureds enrolled in the vehicle (or determined to be enough if a pre-enrollment procedure is followed) the R/I vehicle administrator will be able to project the amount to be received by a participant within the predetermined period of time. Additional vehicles may be established, if the earlier vehicle has maximized the allowable number of participants. A vehicle may have maximized its number of participants for government regulatory reasons if, for example, 500 is reached.

Assuming the number of participants is not maximized in any one vehicle, depending upon the enrollment criteria and procedures, participants may be added or subtracted at predetermined intervals. It is anticipated that enrollment should occur once every three calendar months, although others practicing this invention may choose to set other enrollment dates. The trust will therefore function for three calendar months after each enrollment date (the enrollment period). Proceeds received during the enrollment period are proposed to be distributed within 30 days after the conclusion of the enrollment period. Proceeds received after the conclusion of the enrollment period will be distributed to those trust participants who were trust members at the time the death claim was activated within 30 days of their receipt.

Distribution will proceed according to the following formula:

$$UP_j = NAR_j \times E(q_{x+t})$$

$UP_j$ is the number of participating units that an institution has, per life insured. This is the method by which an institution's level of ownership is determined in the R/I vehicle. This is, in turn, determined from the number of insureds in the R/I vehicle which are owned by the participating institutions. NAR represents the net amount at risk. It equals the amount of insurance that has been assigned to the pool of each insured. $NAR_j$ is the amount to be recovered by the vehicle upon the occurrence of the contingent event. $E(q_{x+t})$ is the probability of occurrence of the contingent event, in this particular embodiment, the expected mortality of an insured, where a participant is age x at the inception of the plan, and the plan is in duration t. (There could be any number of factors that affect the probability of occurrence.) It is anticipated in the most likely cases that those factors will be age and duration, but they should not be viewed as limited to such. It is also expected that the probability will be affected by other factors, with a most likely situation being the gender of the participant.

There are many different ways to calculate $E(q_{x+t})$ as known by those skilled in the statistical art, for example GAM 1983 Mortality Table, UP 1984 Mortality Table, and 1975–1980 Select and Ultimate Basic Mortality Table. It is contemplated herein that the 1975–1980 Select and Ultimate Basic Mortality Table will be used because it is generally the standard table used for these type of purposes. Of course, other methods may be used as well. With respect to the specific embodiment used for life insurance death benefits, whether to use one method instead of another will be a function of the facts and circumstances as to the insurance underwriting criteria for each institution or R/I vehicle.

Total Participation Units for the R/I vehicle is defined as:

$$TUP = \Sigma UPj$$

where j represents each participant in the R/I vehicle.

The allocation Percentage for Participant j is defined as:

$$Alloc\ \%_j = UP_j/TUP$$

Each Participant j's share of the pool receipts equals the total divisible pool receipts for the period times Alloc $\%_j$.

If different underwriting criteria and determinations are made from one individual to another, the allocation to each participant may be adjusted accordingly.

The underwriting class as assigned by the insurance company will be provided to the trustee via the enrollment process. It will be used to determine the best table and most appropriate scaling factor as determined by the trustee or his/her consultant, for example, an actuary to use to determine the expected mortality rate for the individual for that policy year ($E[q_x]$).

The participation units for the life ($UP_j$) are determined by multiplying the policy death benefit assigned to the trust ($NAR_j$) by the ($E[q_x]$) factor.

When the participation units for all lives have been so determined, the total participation units (TUP) for the trust are determined by summing over all lives in the trust.

The allocation percentage for each life (Alloc $\%_j$) is then determined by dividing the participation units for that life by the total participation units.

The total allocation percentage for each participant is determined by summing the allocation percentages for all the policies in the trust that are under his/her/its ownership.

Having submitted all of the factors needed by the vehicle, preferably into a database by an entering means such as a keyboard or mouse or the like and accessed by a processor having sufficient RAM and ROM to process such data, an output may be generated and a statement made about the increase in a certainty of the receipt of funds based on the participants in the vehicle and the data regarding the insureds allocated to the vehicle. Such output will be typically to a CRT and a printer associated with the processor. Specifically, the allocation of death benefits that is received by the R/I vehicle and is to be distributed to the participants is made. It is contemplated that an expectation on the order of as low as 3% of the event occurring, for example in this case, death, can be made based on a minimum of a 100 lives in the R/I vehicle.

For a life insurance trust, a likely scenario would be as follows. All participating lives would undergo similar underwriting scrutiny (i.e. all fully underwritten or all guaranteed issue). $E(q_{x+t})$ would be determined using a common life insurance mortality table reflecting participant's age at policy issue, sex, policy duration and applicable underwriting class (e.g. smoker, non-smoker, standard, substandard, etc.). It is anticipated that any table representative of the probabilities of contingent events could be used in this process, however for the life insurance application it would be likely to use a common table such as the 1975–80 Select & Ultimate Basic Mortality Tables, on a sex and smoking status distinct basis, as is well known in the art. $NAR_j$ would most likely be equal to the Death Benefit to be received on Participant j's life if he were to die at the beginning of the collection period less the offset amount, a predefined amount, such as the cash value of the policy or possibly a different amount, such as the sum of premiums paid to date into the policy. It could also be, for example, non assigned insured's death benefits. The offset amount would be defined prior to entry into the collection pool and would not change during participation in the pool.

It is contemplated here, that there should be a predetermined distribution date. For example, all proceeds received by the R/I vehicle before the distribution date will be collected by the pool and invested by the administrator as per a predetermined investment strategy. Such predetermined investment strategy is outside the scope of this invention. On the distribution date, the total proceeds received, plus any increase from investments are distributed according to the allocation formula.

An example using 6 participants in the present invention follows:

1. A unit investment trust the "Trust" has been established as a receipt/investment vehicle in order to implement the system.

2. 5 participant groups (P) have been enrolled with the following number of insureds:

$P_1 = 25$ insureds ($UP_j 1$–25)

$P_2 = 55$ insureds ($UP_j 26$–81)

$P_3 = 35$ insureds ($UP_j 80$–115)

$P_4 = 35$ insureds ($UP_j 116$–150)

$P_5 = \underline{40}$ insureds ($UP_j 151$–190)

Total = 190 insureds 10 more insureds are necessary in order to allow the trust to begin operation. These 10 insureds will come from participant 6.

$P_6 = 10$ insureds $UP_j(191$–200)

3. Participant Corporation ($P_6$) has obtained life insurance coverage (through direct purchase and/or by insured assignment) of ownership on the lives of 10 if its employees.

4. $P_6$ wishes to assess the ongoing and ultimate financial results pursuant to this transaction, but after a review of several mortality tables it was assumed that the probability of death for each of its only 10 insureds is too small to accurately predict the inflows of death proceeds that are to be received upon each insureds death. $P_6$ wishes to rectify this situation and at the same time achieve a predictable stream of death benefit inflows in as short a time period as possible. 5. In order to accomplish this goal, $P_6$ provides all required data needed by the R/I vehicle database to the R/I vehicle database and has assigned (through enrollment) its desired amount of proceeds to the trust. Other additional participating insured groups may also enroll at this time. Sample calculations for life #1 (j=1 in formnulae):

Life #1 underwriting class & general information: Male, Nonsmoker, Guaranteed Issue, Issue Age 60, Policy Duration 1

Using this information, the 1975–80 Basic Select & Ultimate Mortality Table sets forth the Male Nonsmoker Issue Age 60 expected mortality rate for the 1st policy duration. This is 0.00323.

The scaling factor table for this underwriting class, yields a value of 0.75 for Guaranteed Issue Nonsmokers in policy duration 1. By multiplying 0.00323 by 0.75, to get 0.00242 which is defined as $E[q_{60}]$.

Since this policy has an assigned Death Benefit ($NAR_1$) to the trust of 124,556, the participation units for this policy is calculated by multiplying 124,556 by 0.00242 which equals 301.74. This is defined as $UP_1$.

When this procedure has been repeated for all lives (j=1 to 200), a total number of participation units equal to 85,794.84 (TUP) is realized. By dividing the participation units of life #1 by the total participation units of the trust, we get life #1's allocation percentage (Alloc % $_1$) which equals 301.74/85,794.84=0.35170.

Finally, the total allocation percentage is calculated for the policy owner, P1, by summing the participation units of each policy P1 owns. In this case, because P1 owns policies 1 through 25 which provides a total allocation percentage for P1 of 13.38713% of the trust.

6. Death proceeds are payable to the trust directly by the insurance carrier through the execution of proper insurance carrier death proceed benefit assignment forms.

7. Proceeds received by the trust from the insurance carrier are invested in a manner approved by the participants until the designated distribution date.

Life insurance underwriting class designations have been created in order to better assess the likelihood of mortality on an individual by individual basis in order to most efficiently determine the pricing for premium payment. Such pricing basis is in the form of the lowest price per each age (risks least likely to die) to the highest allowable price.

Underwriting Classes are determined on the basis of risk factors such as: age, health history, family health history, personal habits such as, smoking, drug uses, dangerous vocations or avocations, moral character, financial difficulty or other fact and circumstance items.

The frequency of future enrollment dates has been established as quarterly. At each enrollment period the number of insureds in each participating entity may be increased or decreased.

On each date of enrollment each participant ownership level (of the trust's net after expense proceeds available for distribution at designated time periods—as expressed as a percentage of the entire trust membership) is established.

The frequency of the distribution of any proceeds has been established as quarterly.

8. On the date of distribution the proceeds plus any interest accrued are distributed to the participants pursuant to the distribution formula. For example, the trust has 6 existing participants ($P_{1-6}$), as of the previous enrollment period on Apr. 1. The participants have been accorded the following ownership levels (as expressed by percentage):

$$P^1 = 13.38713\%$$
$$P_2 = 30.39487\%$$
$$P_3 = 18.21456\%$$
$$P_4 = 16.54696\%$$
$$P_5 = 15.97268\%$$
$$P_6 = \underline{\ 5.48381\%}$$
$$100\%$$

One insured in Participant 6 age 44 dies on June 1 (Insured No. 195), and insurance proceeds in the amount of $183,910 are received by the trust. Trust assets of $184,676 ($183,910 insurance proceeds plus earned interest of 2/12 of interest @5 % of $4,597, that is, $766) will be distributed to the trust participants on the scheduled distribution date of July 1 in the following manner:

| Total Amount | | % Ownership | | Distribution |
|---|---|---|---|---|
| $P_1$ - $184,676.00 | × | 13.38713 | = | $24,722.82 |
| $P_2$ - $184,676.00 | × | 30.39487 | = | $56,132.03 |
| $P_3$ - $184,676.00 | × | 18.21456 | = | $33,637.92 |
| $P_4$ - $184,676.00 | × | 16.54696 | = | $30,558.26 |
| $P_5$ - $184,676.00 | × | 15.97268 | = | $29,497.71 |
| $P_6$ - $184,676.00 | × | 5.48381 | = | $10,127.28 |
| | | | | $184,672.00 |

On July 1 the new enrollment to distribution period commences pursuant to updated ownership calculations that take into account possible new trust membership and decreased or increased insureds within each participant group.

Although the particular embodiments shown and described above will prove to be useful in many applications in the insurance and financial art to which the present invention pertains, further modifications of the present invention herein disclosed will occur to persons skilled in the art. All such modifications are deemed to be within the scope and spirit of the present invention defined by the appended claims.

I claim:

1. A method for distributing proceeds from a financial vehicle to participants thereof, wherein the proceeds come from an insurance policy, comprising:

(a) enrolling a participant in the vehicle, wherein said participant owns at least one insurance policy, wherein said at lease one insurance policy is based upon a predetermined statistical probability of an event occurrence, wherein said statistical probability is based upon a predetermined criteria, and wherein said statistical probability of the event occurrence is greater than about 3% based upon a minimum of 100 event possibilities in the vehicle;

(b) assigning said policy to the vehicle;

(c) receiving and applying the proceeds from the policy to the vehicle upon the occurrences of the event; and (d) distributing the proceeds from the vehicle to a participant based upon the relative statistical probability of the policies owned by the participant to other policies in the vehicle.

2. The method of claim 1, wherein said vehicle is a trust.

3. The method of claim 1, wherein said proceeds are death benefits.

4. The method of claim 1, wherein said insurance policy is a life insurance policy.

5. The method of claim 1, where said event occurrence is a death.

6. A system for distributing proceeds from a financial vehicle to participants thereof, wherein the proceeds issue from an insurance policy, comprising:

(a) means of enrolling a participant in the vehicle, wherein said participant owns at least one of the insurance policies, wherein said at least one insurance policy is on a predetermined statistical probability of an event occurrence associated therewith, wherein said statistical probability is based upon a predetermined criteria, and wherein said statistical probability of the event occurrence is greater than about 3% based upon a minimum of 100 event possibilities in the vehicle;

(b) means for assigning said policy to the vehicle;

(c) means for receiving and applying the proceeds from the policy to the vehicle upon the occurrences of the event; and (d) means for distributing the proceeds from the vehicle to a participant based upon the relative statistical probability of the policy to the other policies in the vehicle.

7. The system of claim 6, wherein said vehicle is a trust.

8. The system of claim 6, wherein said proceeds are death benefits.

9. The system of claim 6, wherein said insurance policy is a life insurance policy.

10. The system of claim 8, wherein said event occurrence is a death.

* * * * *